(12) United States Patent
Tenca et al.

(10) Patent No.: US 7,394,219 B2
(45) Date of Patent: Jul. 1, 2008

(54) ENCODER UNIT AND PROCESS OF ASSEMBLING SAME

(75) Inventors: Vittorio Tenca, Caprino Veronese (IT); Corrado Carradori, Pescantina (IT)

(73) Assignee: PWB-Ruhlatec Industrieprodukte GmbH, Seebach (DE)

( * ) Notice: Subject to any disclaimer, the term of this patent is extended or adjusted under 35 U.S.C. 154(b) by 486 days.

(21) Appl. No.: 11/193,039

(22) Filed: Jul. 29, 2005

(65) Prior Publication Data

US 2006/0022531 A1 Feb. 2, 2006

(30) Foreign Application Priority Data

Jul. 29, 2004 (DE) .................. 10 2004 036 903

(51) Int. Cl.
*G05B 1/06* (2006.01)
(52) U.S. Cl. .................. 318/640; 318/652; 250/231.13
(58) Field of Classification Search ........... 318/434, 318/565, 685, 696, 618, 652, 640; 250/231.13; 341/192
See application file for complete search history.

(56) References Cited

U.S. PATENT DOCUMENTS

| | | | | |
|---|---|---|---|---|
| 4,184,071 A * | 1/1980 | Fryer et al. | ............ | 250/231.16 |
| 4,285,595 A * | 8/1981 | Fryer et al. | .................. | 356/150 |
| 4,942,295 A | 7/1990 | Brunner et al. | | |
| 5,038,088 A * | 8/1991 | Arends et al. | ................ | 318/565 |
| 5,057,684 A | 10/1991 | Service | | |
| 5,081,756 A | 1/1992 | Abe et al. | | |
| 5,155,401 A | 10/1992 | Kanaya et al. | | |
| 5,184,038 A | 2/1993 | Matsui et al. | | |
| 5,708,496 A | 1/1998 | Barnett et al. | | |
| 5,859,425 A * | 1/1999 | Mleinek et al. | ........ | 250/231.13 |
| 5,883,384 A | 3/1999 | Kato et al. | | |
| 6,249,068 B1 | 6/2001 | Knopp et al. | | |
| 6,462,442 B1 | 10/2002 | Braun et al. | | |
| 6,534,888 B1 | 3/2003 | Vorberg et al. | | |
| 2005/0179328 A1 | 8/2005 | Vittoro | | |
| 2007/0096018 A1 * | 5/2007 | Yoshioka | ................ | 250/231.13 |

FOREIGN PATENT DOCUMENTS

| | | |
|---|---|---|
| DE | 3908932 | 12/1989 |
| DE | 4304914 | 9/1993 |
| DE | 69114262 | 3/1996 |
| DE | 19641929 | 4/1998 |
| DE | 201 20 932 U1 | 5/2002 |
| EP | 0557564 | 9/1993 |
| EP | 1 055 915 A1 | 11/2000 |
| JP | 59-063950 | 4/1984 |

* cited by examiner

*Primary Examiner*—Paul Ip
(74) *Attorney, Agent, or Firm*—Darby & Darby

(57) ABSTRACT

An encoder unit releasably secured to the flange end of a motor with a form-fitting and positive connection comprises an encoder housing with guide grooves for receiving a printed circuit board (PCB), a recess for receiving the motor shaft, and at least one moveable side wall. A timing disc and hub are positioned on the motor shaft within the encoder housing beneath the PCB. The PCB, a sensor unit fixed, and the movable side wall are slid into the guiding grooves to press an abutment against the hub. The pre-assembled encoder housing can be placed onto a base plate at the flange end of the motor. Pressure movement fully insert the PCB into the housing cover so that the sensor unit records the code markings of the timing disc and so that an abutment is removed from a region of contact with the timing disc hub.

11 Claims, 2 Drawing Sheets

ENCODER UNIT AND PROCESS OF ASSEMBLING SAME

The invention relates to an encoder unit consisting of a base plate for fixing the encoder at the flange end of an electric motor or to any other driven shaft; a timing disc with code markings which is radially and axially fixed by a press fit on a motor shaft projecting from the electric motor at the flange end; at least one sensor which, in the region of the code markings of the timing disc, is positioned and fixed in all three coordinate directions, a printed circuit board for connections for incoming and outgoing lines and, optionally, for fixing connecting bushes for signal lines and for the energy supply to the sensors; and an encoder housing which is fixed to the electric motor. Furthermore, the invention relates to a process of assembling the encoder unit and of positioning/fixing same at the flange end of an electric motor or other driven shaft.

BACKGROUND

An encoder unit of the initially mentioned type is known from EP 1 055 915 (PWB-Ruhlatec GmbH) wherein the encoder consists of an interlocking housing which, at the end face, is flanged on to a motor which, at least in one flange plane, comprises a motor shaft projecting into the housing. The housing consists of a base plate with an inner housing part and an upper housing part, which two parts, for assembly purposes, can be interlocked relative to one another, wherein bayonet segments are arranged on the inner housing part, which bayonet segments engage matching recesses in the upper housing part. During a rotational movement for form-fittingly and positively connecting the bayonet segments, wedge-shaped guiding faces slide on one another, so that the upper housing part is separated from the base plate, as a result of which the timing disc is "cleared" on the motor shaft.

The German utility model DE 291 20 932 U1 (PWB-Ruhlatec Industrieprodukte GmbH) proposes a motor/sensor system wherein on a printed circuit board there are provided at least two contact pins for supplying power to the electric motor fixed by a fixing bracket on the printed circuit board. During the fixing process, the timing disc secured on the motor shaft is positioned in the slot of a sensor/emitter unit. Through a semi-circular cut-out in the fixing bracket, the shaft end of the sensor/emitter unit is self-centringly positioned with reference to the timing disc secured on the shaft end of the electric motor. However, said fixing is open on all sides, so that the prior art motor/sensor system is exposed to environmental influences.

Encoder systems are subject to stringent requirements in respect of reliability under fluctuating temperatures, in respect of accurate positioning and resolution quality. As such encoder systems are mass-produced, there is a need for designs which are easy to produce and which consist of a few simple components which are not subject to failure.

For some time now, the high surface quality of the motor shaft is used for fixing the timing discs via a timing disc hub by means of a press fit. As it is necessary to observe very close tolerances, the pressure forces are correspondingly high. After the assembly process has been completed, the timing disc has to be "cleared" so to speak, which in EP 1 055 915 is achieved by rotating wedge-shaped bayonet faces. However, the prior art system is not suitable for larger timing disc diameters and larger printed circuit boards.

It is therefore the object of the present invention to provide an encoder unit and a process of assembling same which can be carried out quickly and easily and with a minimum of tools. The pre-assembled unit is to be protected against dirt and mechanical damage to the timing disc. A further requirement consists in that the encoder can be tested as a component. After the unit has been pre-assembled on the electric motor or on some other driven shaft, there shall be no need for individual parts of the unit to be removed or newly added.

SUMMARY OF THE INVENTION

In accordance with the invention, the objective is achieved by the characteristics given in claims 1 and 4. It has been found that the timing disc can already be positioned in the pre-assembled, closed housing and that during the final assembly stage, it is automatically adjusted on the motor shaft or the some other driven shaft.

It is possible for any sensors to be arranged on different printed circuit boards, with their position relative to the timing disc being determined during pre-assembly by simple means.

The distance in respect of height between the timing disc and the flange plane of the motor and with reference to the sensor is determined by the geometric shape of the timing disc hub. Different hub heights regulate the distance is respect of height of the timing disc.

By arranging connecting bushes on the printed circuit board it is possible to use different standard connectors. In this way, it is possible to functionally integrate all types of sensors and code markings.

When producing the press fit, the printed circuit board has a special function in that it forms an abutment together with the correspondingly designed guide in the housing cover and encoder housing respectively. By means of a movable side wall of the encoder housing, the sensor is moved on the printed circuit board from one side into the region of the code markings of the timing disc. In this way there is achieved a greater variability in the case of different timing disc diameters. Individual components can be added or replaced during the pre-assembly of the printed circuit board. After completion of the pre-assembly stage, the unit is fully accommodated in the housing.

The encoder unit can be dismantled in the same way in which it is assembled. For example, other components can be added to the printed circuit board or replaced. It is also possible to use different types of encoder units with connecting bushes, directly attached cable connections or with a specially designed sensor/connector unit. These can be tested prior to assembly and are therefore less likely to fail in the mounted condition.

The idea of the inventive assembly process consists in that, first, a housing open at the top end is arranged at the flange end of the motor or of some other driven shaft, with the timing disc being introduced into said housing by means of a timing disc hub. For positioning purposes, there is provided an indentation in the base plate and a collar at the timing disc hub which regulates the distance between the timing disc and the base plate.

After said first assembly stage, the sensor fixed to a printed circuit board can be slid into the housing by means of a movable side wall. The pre-assembly stage is completed when the housing with the loosely inserted timing disc and the timing disc hub, with the housing cover being placed on to the housing, is secured on the base plate of the motor or of some other driven shaft and when, on one side, in a guide of the housing cover, the printed circuit board provided with a sensor is slid in far enough to enable an anvil to form above the timing disc.

For forming the abutment, an anvil is positioned near the end of the printed circuit board. As soon as the end of the printed circuit board, together with the anvil, is positioned above the timing disc, it is possible to apply an axial pressure to the timing disc hub for producing a press connection with the motor shaft or some other driven shaft.

The assembly of the encoder unit is completed as soon as the printed circuit board together with the moved side wall of the housing has been pushed forward far enough to enable the anvil to be released from the engagement with the timing disc hub, as a result of which the abutment function is eliminated. This is referred to as the "clearing" of the timing disc which is now able to move in a contact-free way in the housing and in the slotted opening of the sensor. It is advisable for the movable side wall then to be anchored in suitable fixing means of the housing, so that the encoder unit is closed on all sides.

Below, the invention will be explained in greater detail with reference to several embodiments.

DETAILED DESCRIPTION OF CERTAIN EMBODIMENTS OF THE INVENTION

Figure 1:
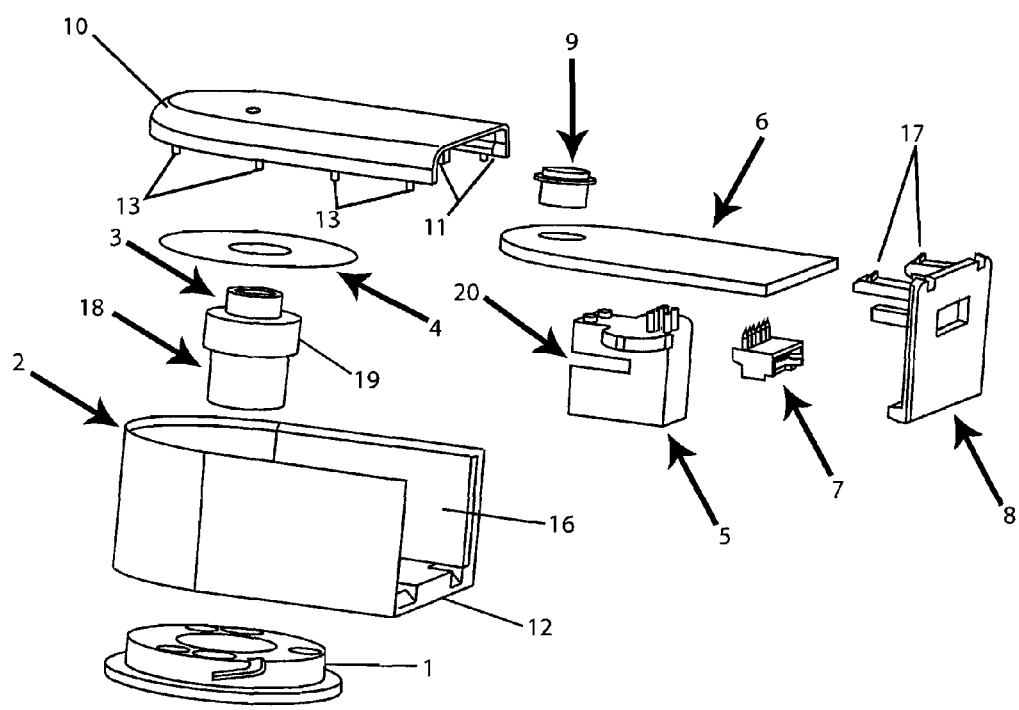
FIG. 1 is a perspective view of an inventive encoder unit in an exploded view prior to being assembled.

The encoder shown in FIG. 1 constitutes a modular system consisting of a base plate 1, a housing 2, a timing disc hub 3, a timing disc 4, a sensor unit 5, a printed circuit board 6, a connecting bush 7, a movable side wall 8, an anvil 9, a housing cover 10, guiding grooves 11, a housing base plate 12 and guiding elements 13.

Because of its modular design, the encoder can be used with reflective and also with transmissive timing disc, which means that it is much more variable and adaptable to different sensor technologies than state of the art encoders.

Figure 2:
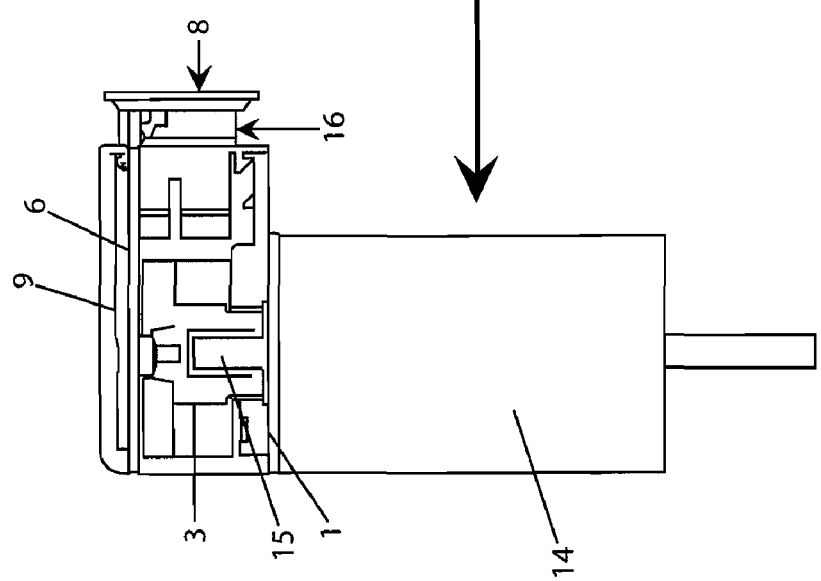
FIG. 2 is an illustration of a pre-assembled encoder unit, partially in section (side view).

In FIG. 2, the inventive encoder is connected in the pre-assembled condition to a motor 14. The hub 3 is secured to the motor shaft 15 via a press fit. Above the motor shaft 15, there is arranged an abutment, in this case in the form of an anvil 9 which is fixed to the printed circuit board 6.

The movable side wall 8 indicates that the encoder is in the pre-assembled condition. Only when, according to FIG. 3, the movable side wall 8 has been fully inserted into the encoder housing 2, is the side opening 16 of the housing covered by the movable side wall 8, so that the housing 2 is closed completely. A hook-shaped clamp 17 secures the housing in the closed condition.

Figure 3:
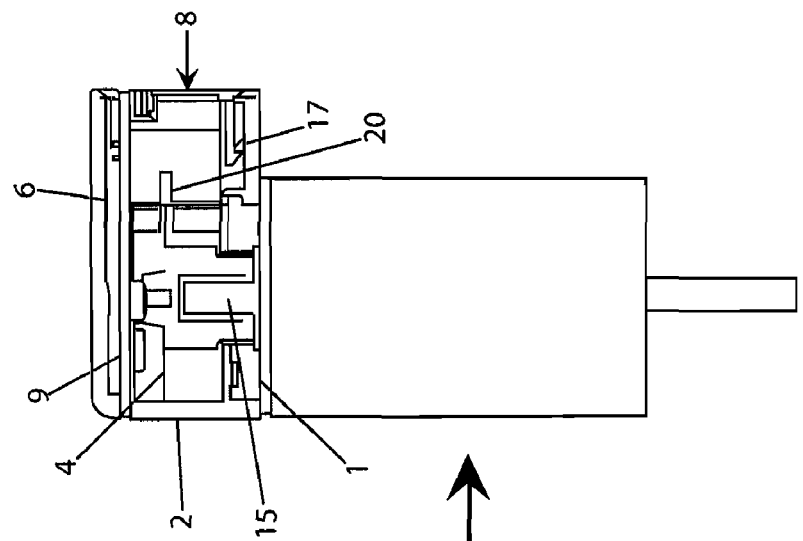
FIG. 3 is an illustration of an inventive encoder unit after the timing disc has been cleared.

At the same time it can be seen in FIG. 3 that the anvil 9 has been removed from the motor shaft 15, as a result of which the timing disc 43 is cleared. The timing disc 4 is now located with its code markings in the sensor region of the sensor unit 5. There is sufficient space for the different types of sensors, so that transmissive timing discs can also be used.

An advantageous variant for fixing the encoder unit on the electric motor consists in arranging bayonet-shaped locks on the base plate mounted at the flange end, whereupon, as a result of a simple rotational movement of the encoder housing, it is possible to produce a form-fitting connection between the encoder and the motor.

FIG. 1 indicates the bayonet-shaped indentations. They also comprise a locking position, so that the encoder unit cannot unintentionally be released from the motor.

To achieve a space-saving design, the housing base plate is provided with an indentation for receiving the base plate mounted at the flange end. Tools are required only for fixing the base plate at the flange end; all other fixings can be form-fittingly achieved by using screws or clips. The assembly process is completed by inserting the printed circuit board into its end position. The encoder unit is then ready for operation.

The invention claimed is:

1. An encoder unit for a motor having a shaft and a flange end, comprising:
   (a) a printed circuit board having an underside;
   (b) an encoder housing fixed to the electric motor and comprising a base plate, a cover arranged parallel to the base plate, and side walls,
   wherein the base plate is releasably fixed at the flange end of the motor and includes a recess sized to receive the motor shaft,
   wherein the encoder housing includes guiding grooves sized to receive the printed circuit board in parallel to the base plate, and
   wherein at least one of the side walls is removably anchorable to the encoder housing;
   (c) a timing disc hub disposed within the recess of the encoder housing base plate and beneath the underside of the printed circuit board;
   (d) a timing disc supported on the timing disc hub and having code markings;
   (e) at least one sensor connected to the printed circuit board and disposed in the region of the code markings, the sensor being fixed in all three coordinate directions; and
   (f) an abutment supported by the printed circuit board and having a first position in contact with the timing disc hub when the printed circuit board is not fully received within the encoder housing and a second position clear of contact with the timing disc hub.

2. A device according to claim 1, wherein the connection between the base plate at the flange and the housing base plate comprises a bayonet lock.

3. A device according to claim 1, wherein the removably anchorable side wall is anchored in the housing base plate by a clip.

4. A device according to claim 1, further comprising guiding elements on the encoder housing cover positioned to affix the removably anchorable side wall.

5. A device according to claim 1, wherein the sensor has a slot surrounding a measuring plane, and wherein the timing disc hub supports the timing disc upon a contact face which is aligned with the measuring plane of the sensor.

6. A device according to claim 1, wherein the timing disc hub includes a lower portion which engages the motor shaft via a press-fit connection, and wherein the recess in the base plate provides a guide for the lower portion press-fit connection.

7. A process of assembling an encoder unit of the type comprising a housing that affixes the encoder unit at a flange end of a motor having a shaft, a printed circuit board, a timing disc having code markings, a timing disc hub fixed to the motor shaft, at least one sensor disposed in the region of the code markings and fixed in all three coordinate directions with accuracy, comprising the steps of:
   (a) fixing a first base plate at the flange end of the electric motor;
   (b) pre-assembling the encoder housing comprising a cover having guiding grooves, a base plate having a recess in the region of the motor shaft, a plurality of side walls of which at least one side wall is movably guided to engage the guiding grooves of the cover by:
  (i) placing the timing disc hub and the timing disc within the recess in the base plate;
  (ii) fixing the at least one sensor to the printed circuit board;
  (iii) sliding the printed circuit board together with the movable side wall into the guiding grooves of the cover and parallel to the base plate so as to press an abutment against the timing disc hub;
(c) connecting the pre-assembled encoder housing on the first base plate while at the same time applying a pressing movement to the timing disc and the timing disc hub in the direction of the motor shaft; and
(d) completing assembly of the encoder housing by further sliding the printed circuit board together with the movable side wall completely into the encoder housing cover so as to clear the abutment of contact with the timing disc hub,
whereby the sensor unit records the code markings of the timing disc and the encoder unit in a condition in which it is ready for operation.

8. A process according to claim 7, wherein the first base plate is fixed concentrically relative to the motor shaft at the flange end of the motor.

9. A process according to claim 7, wherein the recess in the base plate and the guiding grooves in the cover center the printed circuit board with the sensor fixed thereto with reference to the timing disc fixed on the motor shaft.

10. A process according to claim 7, wherein the step of sliding the printed circuit board comprises sliding the sensor fixed to the printed circuit board into the cover sufficiently far so as to allow an abutment arranged near an end of the printed circuit board to engage an upper portion of the timing disc hub.

11. A process according to claim 7, wherein the pre-assembled encoder housing plugs onto the motor shaft, wherein the timing disc is pressed onto the motor shaft, and comprising the additional steps of rotating the encoder housing to fix the base plate on the flange end and then sliding the moveable side wall fully into the encoder housing.

* * * * *